Aug. 11, 1953  D. C. ALEXANDER  2,648,720
OPEN WIRE TRANSMISSION LINE
Filed Nov. 18, 1948
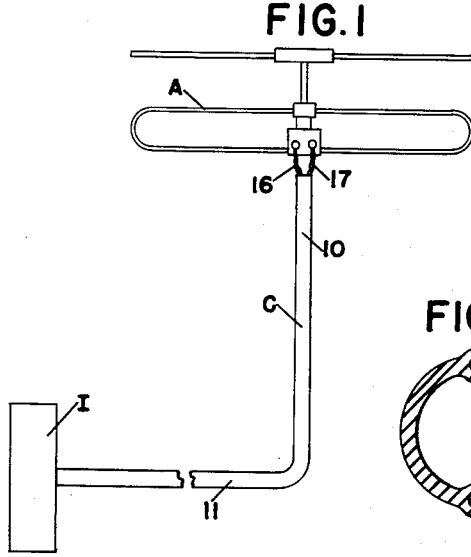
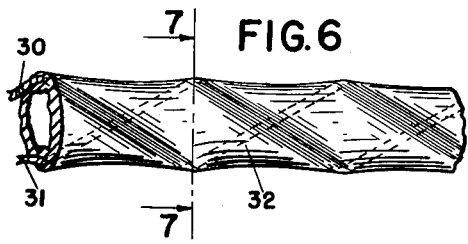
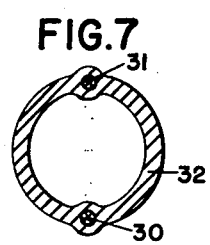
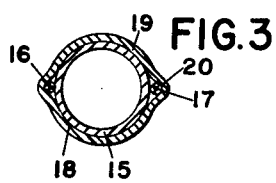
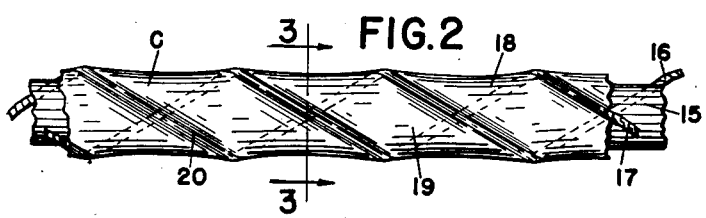
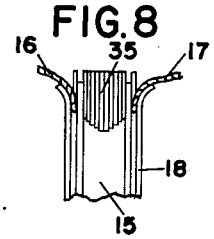
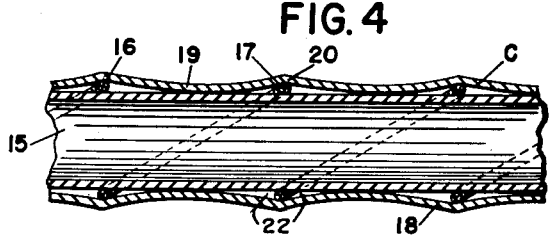
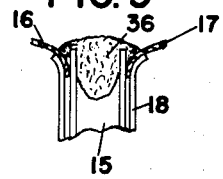
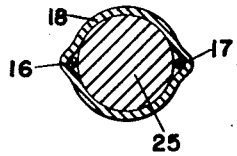
INVENTOR
DONALD C. ALEXANDER
Walter H Wakefield
ATTORNEY Patented Aug. 11, 1953

2,648,720

UNITED STATES PATENT OFFICE 2,648,720

OPEN WIRE TRANSMISSION LINE

Donald C. Alexander, Worcester, Mass., assignor to Surprenant Mfg. Co., Boston, Mass.

Application November 18, 1948, Serial No. 60,720

2 Claims. (Cl. 174—34)

This invention relates to improvements in open wire electric transmission lines or conductors to connect an antenna with an electric instrument or apparatus, whether the latter be a receiver or transmitter, or to connect together two electrical instruments, and it is the general object of the invention to construct such a conductor so as to minimize the effect of stray electric waves or radiations which might otherwise interfere with the passage of a signal current through the conductor under all weather conditions.

When the transmission line is used between an antenna and a receiving set it will cancel out the effects of such interfering radiations as would otherwise induce noise in a receiver, and when the line is used at a transmitting station it will prevent stray radiation which might otherwise interfere with the proper operation of the transmitting antenna. When used between two instruments, as for example between a signal source and a measuring instrument, it will prevent stray radiations from interfering with the signal being measured.

Certain forms of electric apparatus operated by electric waves, such as television sets, employ an antenna connected to a receiving set by a transmission line or conductor made with two wires. The desired waves are intercepted by the antenna and are transmitted through the conductor, but the latter is always in position to intercept undesired waves which set up electric potentials the effect of which interferes with the signal current derived from the desired waves or radiation. In the past various forms of open wire transmission conductors have been proposed including two parallel insulated wires, but so far as is known their use has resulted in considerable noise in receiving and transmitting sets, and they have been adversely affected by moisture and ice which accumulates on them during bad weather.

It is an important object of the present invention to place the conductor wires on a carrier of insulating material which forms part of the line in such relationship that the electric potentials induced by the undesired radiation will cancel each other and thus reduce noise to a minimum. This result can be accomplished by having the wires disposed helically and maintained in that relationship on a carrier of low loss dielectric material which is substantially circular in cross section throughout its length, thereby avoiding spaces or pockets in which water and ice can collect. The carrier thus formed provides a dielectric structure such that the major portion of the dielectric flux remains inside the dielectric.

It is a further object of the invention to inclose the wires within the line in such a way that their helical relationship and spacing will be preserved throughout the length of the transmission line. In this feature of the invention the insulation material forming part of the line preserves its normal form without appreciable tendency to twist and it is for this reason that the helically disposed wire can be held in proper position with respect to each other throughout the length of the line.

It is a still further object of the invention to provide a transmission line wherein that part of the latter which supports and holds the wires in correctly spaced relation is made of a low loss dielectric material, such as polyethylene.

In the design of a transmission line it is often desirable to be able to vary the impedance without necessarily varying the physical dimensions of the line, or the size of the wires used in the conductor. This variation cannot be readily accomplished when the conducting wires are parallel, as in previously known transmission lines. By having the wires disposed helically, however, the impedance of the line can be controlled by varying the lay of the wires.

In the installation of the transmission line, whether for receiving sets or transmitting apparatus, it is desirable to seal its ends in such manner as to prevent entrance of moisture and also hold the wires spaced apart so that they will not contact each other and short circuit the line. It is a further object of the invention to employ a carrier for the wires made of a form of insulation which will burn and flow together to provide a seal which keeps the interior of the line dry and also holds the wires in correctly spaced relationship. For this purpose the insulation can conveniently be made of polyethylene.

In order that the invention may be clearly understood reference is made to the accompanying drawings which illustrate by way of example three embodiments of the invention and in which:

Fig. 1 is a diagrammatic view setting forth the relationship of the improved transmission line or conductor with an antenna and an electric instrument, such as a receiving set or a transmitting station, Fig. 2 is an elevation of part of the transmission line made according to the preferred form of the invention, parts being broken away to illustrate the relation between the core, the conductor wires, and the sheath, Fig. 3 is an enlarged vertical section on line 3—3, Fig. 2, Fig. 4 is a longitudinal section on an enlarged scale through the conductor shown in Fig. 2, Fig. 5 is a view similar to Fig. 2 but showing the first modification of the invention, Fig. 6 is a view similar to Fig. 2, but showing the second modification, Fig. 7 is an enlarged vertical section on line 7—7 of Fig. 6, Fig. 8 indicates diagrammatically the first step in the formation of a seal at one end of the line, and Fig. 9 is an elevation of the end of the line after the seal has been completely formed.

Referring particularly to Fig. 1, the antenna designated generally at A and the instrument I, which may be either a receiver such as a television set, or transmitting apparatus, are of usual known form. The transmission line or conductor which forms the subject matter of this invention is indicated at C and is connected in conventional manner to both the antenna and the instrument. In many installations the lead-in or transmission conductor may be bent so that part of it will be vertical as indicated at 10 and another part of it horizontal as at 11. During bad weather the horizontal part of the lead-in or transmission conductor may have drops of water collected on its under side, or may be encased in ice, and of course some water and ice is likely to adhere to the vertical part 10.

In the preferred form of the invention the transmission line or conductor comprises a hollow or tubular core 15 which is preferably made of a low loss dielectric material, such as polyethyene, and has wrapped thereon two conductor wires 16 and 17 which may be either single wires or stranded. The wires are disposed helically around the core and have the same lay and are preferably equally spaced around the periphery of the core so that a plane transverse of the core 15 and perpendicular to its axis will cut the two conductors at points spaced apart 180 degrees around the core, see Fig. 3. Surrounding the core and the wires is a sheath 18 which is of tubular form and is preferably made of low loss dielectric material, such as polyethylene, the same as the core 15.

The sheath as shown more particularly in Fig. 4 has portions 19 thereof in engagement with the core 15, while other parts 20 thereof curve upwardly from the core to inclose the wires. The sheath is applied after the wires have been wrapped around the core and is sufficiently elastic to shrink at those points designated at 19 to establish close fitting relation with the core and thus hold the wires in correct position so that the lay of the two wires is preserved by the sheath through out the length of the line. The wires are also held in uniform peripheral spaced relation around the core by the sheath. As seen in Fig. 3 the transmission line is generally of circular cross-section and has no spaces or pockets in which water or ice can collect. The core and sheath form a carrier for the wires which holds them in correct relation with respect to each other, and being hollow, the carrier is of light weight and can be readily bent around corners due to its flexibility. As shown in Fig. 4 the parts of the sheath adjacent to the wires are held by the latter apart from the core to define spaces 22.

In the first modified form of the invention shown in Fig. 5 the core 25 is solid and is made preferably of the same material as is the core 15. The wires and sheath may be the same as in the preferred form, and serve as a carrier for the wires. When the core is made solid the outside diameter of the transmission line will be greater for the same electric properties than is the case when the core is tubular as in the preferred form.

In the second modified form shown in Figs. 6 and 7 the wires are embedded in a tube. As shown more particularly in Fig. 7, the wires 30 and 31, which correspond to the wires of the other forms, may be either single or stranded and are embedded in a tube 32 made of a low loss dielectric material such as polyethylene. In this second modified form of the invention the tube 32 is extruded around the wires to embed and hold them in their correct position with respect to lay and uniform peripheral distribution. The tube 32, as is the case in the other forms of the invention also, tends to remain straight without substantial twisting and thereby acts as a carrier which holds the wires in correct position. It will also be observed from Fig. 7 that the tube 32 is generally of circular form and is free from pockets or recesses in which water and ice can collect.

While the cores and sheaths of the preferred and first modified form of the invention and tube 32 of the second form of the invention have been described as being made preferably of polyethylene, the invention is not necessarily limited to this type of plastic material, since any material having similar electric properties will suffice. The polyethylene, however, is waterproof and is possessed of excellent electric properties and keeps the wires dry under all conditions of weather.

A convenience of installation growing out of the use of polyethylene as a dielectric material is illustrated in Figs. 8 and 9. When the wires of the transmission line are to be connected to either the antenna or an electric apparatus part of the material around the wires will be stripped off to expose the required length of bare wire. This material which is stripped off can be cut into narrow strips 35, see Fig. 8, and inserted into the tubular core 15 of the preferred form or the tube 32 of the second modification. After enough of these strips 35 have been placed within the tube to substantially close the ends of the latter the strips are ignited and fuse together to form a seal 36, see Fig. 9, which effectively closes the end of the transmission line and not only prevents entrance of moisture and ice but also holds the bare wires separated so that they cannot contact each other. This same procedure can be followed in the first modified form of the invention where narrow strips will be placed between the sheath and the wires and then ignited so that they will fuse to prevent entrance of moisture between the solid core and those parts of the inclosing sheath which are spaced therefrom, and also hold the wires spaced apart.

Where desired, the sheath in the first and second forms, and the tube 32 in the third form, can be impregnated with a pigment or similar material which will make it opaque to light, the coloring material being chosen so as not to lower the dielectric properties of the insulating material.

From the foregoing it will be seen that the invention sets forth a simple form of transmission line having an exterior form which is free from recesses or pockets in which ice or water can collect. In all forms of the invention the line is substantially circular in cross section and the insulating or dielectric material which serves as a carrier for the wires extends to a considerable distance beyond and perpendicular to a straight line joining the two wires at any point along the length of the line. The round construction of the polyethylene sheath serves to confine the major portion of the electric field between the two wires so that only a small percentage of the total electric flux gets outside of the dielectric. This means that ice or moisture having dielectric properties different from that of air will have very little effect on the characteristics of the transmission line. It will also be seen that the wires, due to their helical arrangement, neutralize the effects of the undesired radiations which are intercepted by the transmission line, and also neutralize the stray radiated fields of the transmission line which might otherwise interfere with the proper operation of the antenna of a transmitting station. Also, because of the helical disposition of the wires the impedance of the transmission line can be changed by varying the lay of the wires. The longer the lay the lower the inductance per unit length and consequently the lower the impedance of the line, since the capacity per unit length will remain essentially constant. Conversely, if it is desired to increase the impedance of the line the lay can be made shorter. When the dielectric material is polyethylene small strips of it can be inserted into open spaces at the end of the conductor and fused to form a plug which effectively seals the end of the line to keep moisture out of the transmission line and also keep the bare wires spaced from each other. The sheath is spaced from the core at the wires and can thus be cut to permit the wires to be drawn laterally from the core and through the sheath without risk of damaging the core. The carrier is generally of cylindrical form with the wires disposed helically and preferably equally spaced circumferentially around the carrier axis in all forms of the invention. The carriers are made of a waterproof low loss dielectric material, such as polyethylene. In the preferred and first modified form of the invention a large part of the interior of the inclosing sheath engages the core and thereby holds the wires in correctly spaced relation, but the sheath, being separate from the core, can be stripped off to uncover the wires without damage to the core. In the second modified form of the invention the wires are embedded within the tube. In all forms of the invention the wires are located within the outer surface of the transmission line.

Having now particularly described and ascertained the nature of the invention and in what manner the same is to be performed, what is claimed is:

1. In an open wire electric transmission line, a central cylindrical tubular core made of polyethylene and having an outer surface of uninterrupted circular cross sectional form, a pair of electric conductor wires extending helically around the outside of said core and having the same lay and engaging said uninterrupted surface of the core, and an inclosing sheath made of polyethylene surrounding the core and wires and being in engagement with the core at points between the wires and effective due to engagement with said outer surface of the core to hold the wires in such position that those parts of the wires cut by a plane transverse of and perpendicular to the axis of the line will be spaced substantially 180 degrees from each other around the core, those parts of the sheath engaging the wires being spaced from the core to permit cutting thereof adjacent to the wires at points spaced from the core to enable the wires to be drawn away from the core and through the sheath.

2. In an open wire electric transmission line, a central cylindrical tubular core made of polyethylene and having an outer surface of uninterrupted circular cross sectional form, a pair of electric conductor wires extending helically around the outside of said core and having the same lay and engaging said uninterrupted surface of the core, an inclosing sheath made of polyethylene surrounding the core and wires separate from the core but engaging the latter between the wires and effective due to engagement with said core to hold the wires in such position on the core that those parts of the wires cut by a plane transverse of and perpendicular to the axis of the line will be spaced substantially 180 degrees from each other around the core, the wires separating the core and sheath to define spaces, said sheath due to the fact that it is separate from the core being removable from the line independently of the core to uncover the wires and leave the core intact, and a plug of polyethylene fused to both the core and sheath to seal said spaces and the core.

DONALD C. ALEXANDER.

References Cited in the file of this patent

UNITED STATES PATENTS

| Number | Name | Date |
|---|---|---|
| 336,992 | Clark | Mar. 2, 1886 |
| 1,305,247 | Beaver et al. | June 3, 1919 |
| 2,149,223 | Mason | Feb. 28, 1939 |
| 2,186,793 | Wodtke | Jan. 9, 1940 |
| 2,204,737 | Swallow | June 18, 1940 |
| 2,230,069 | Rushmore | Jan. 28, 1941 |
| 2,431,871 | Huyett | Dec. 2, 1947 |
| 2,466,720 | Main | Apr. 12, 1949 |
| 2,543,696 | Krueger | Feb. 27, 1951 |

FOREIGN PATENTS

| Number | Country | Date |
|---|---|---|
| 104,401 | England | Sept. 18, 1916 |